(12) United States Patent
Hamby et al.

(10) Patent No.: US 7,947,248 B2
(45) Date of Patent: May 24, 2011

(54) PYROLYZED RUBBER PRODUCTS AND PROCESSES

(75) Inventors: Kenneth Wesley Hamby, The Woodlands, TX (US); James Brian Kelly, La Jolla, CA (US); Timothy Joseph Kuhn, Perrysburg, OH (US)

(73) Assignee: Tellus Technology, LLC, San Diego, CA (US)

( * ) Notice: Subject to any disclaimer, the term of this patent is extended or adjusted under 35 U.S.C. 154(b) by 307 days.

(21) Appl. No.: 12/121,139

(22) Filed: May 15, 2008

(65) Prior Publication Data

US 2008/0286192 A1 Nov. 20, 2008

Related U.S. Application Data

(60) Provisional application No. 60/938,480, filed on May 17, 2007.

(51) Int. Cl.
*C01D 3/00* (2006.01)
*B32B 5/16* (2006.01)
*B22F 3/00* (2006.01)
*B01F 13/00* (2006.01)

(52) U.S. Cl. .................. 423/449.1; 423/449.8; 428/402; 425/222; 366/342

(58) Field of Classification Search ........................ None
See application file for complete search history.

(56) References Cited

U.S. PATENT DOCUMENTS

| | | | |
|---|---|---|---|
| 4,030,984 A * | 6/1977 | Chambers | ........................ 201/25 |
| 4,203,804 A | 5/1980 | Janning et al. | |
| 4,284,616 A | 8/1981 | Solbakken et al. | |
| 4,647,443 A | 3/1987 | Apffel | |
| 4,648,328 A | 3/1987 | Keough | |
| 5,037,628 A | 8/1991 | Fader | |
| 5,057,189 A * | 10/1991 | Apffel | .......................... 202/113 |
| 5,087,436 A | 2/1992 | Roy | |
| 5,099,086 A | 3/1992 | Roy | |
| 5,208,401 A | 5/1993 | Roy | |
| 5,229,099 A | 7/1993 | Roy | |
| 5,230,777 A | 7/1993 | Jarrell | |
| 5,389,691 A * | 2/1995 | Cha et al. | ........................ 521/41 |
| 5,449,438 A | 9/1995 | Jagau et al. | |
| 5,451,297 A | 9/1995 | Roy | |
| 5,464,503 A | 11/1995 | Avetisian et al. | |
| 5,550,312 A | 8/1996 | Schingnitz et al. | |
| 5,744,668 A | 4/1998 | Zhou et al. | |
| 5,783,046 A | 7/1998 | Flanigan | |
| 5,821,396 A | 10/1998 | Bouziane | |
| 5,853,687 A | 12/1998 | Morlec et al. | |
| 5,894,012 A | 4/1999 | Denison | |

(Continued)

*Primary Examiner* — Melvin C Mayes
*Assistant Examiner* — Guinever S Gregorio
(74) *Attorney, Agent, or Firm* — Fraser Clemens Martin & Miller LLC; Jacob M. Ward

(57) ABSTRACT

A pyrolysis process is provided. The process includes the steps of: depositing a quantity of waste into a porous container, the porous container adapted to allow a convective stream of substantially anaerobic gas to flow therethrough; inserting the porous container into a pyrolysis thermal processor; sealing the thermal processor; circulating the convective stream of gas through the pyrolysis thermal processor; heating the waste according to a first time-temperature profile to pyrolyze the waste and form a carbonaceous char; and cooling the carbonaceous char by circulating the convective stream of gas through a cooler. An oil product and a gaseous hydrocarbon product are produced during the pyrolysis. The carbonaceous char is further processed to form a carbon black product and a recyclable metal product.

7 Claims, 14 Drawing Sheets

U.S. PATENT DOCUMENTS

| | | |
|---|---|---|
| 6,271,427 B1 * | 8/2001 | Ershag ............... 585/241 |
| 6,372,948 B1 | 4/2002 | Flanigan |
| 6,659,025 B2 | 12/2003 | Yu |
| 6,736,940 B2 | 5/2004 | Masemore et al. |
| 6,835,861 B2 | 12/2004 | Nichols et al. |
| 7,037,410 B2 | 5/2006 | Flanigan |
| 7,101,463 B1 | 9/2006 | Weinecke et al. |
| 7,341,646 B2 | 3/2008 | Nichols et al. |
| 2002/0117388 A1 | 8/2002 | Denison |
| 2003/0009067 A1 | 1/2003 | Bouziane et al. |
| 2004/0047779 A1 | 3/2004 | Denison |
| 2004/0204620 A1 | 10/2004 | Grispin |
| 2005/0023124 A1 | 2/2005 | Karpetsky et al. |
| 2005/0165262 A1 | 7/2005 | Nichols et al. |
| 2006/0163053 A1 | 7/2006 | Ershag |
| 2007/0286779 A1 | 12/2007 | Steinmeyer et al. |

* cited by examiner

PYROLYZED RUBBER PRODUCTS AND PROCESSES

CROSS-REFERENCE TO RELATED APPLICATIONS

This application claims priority to U.S. Provisional Patent Application No. 60/938,480, filed May 17, 2007, the disclosure of which is hereby incorporated herein by reference in its entirety.

FIELD OF THE INVENTION

The present disclosure relates to waste recycling and, more particularly, to pyrolysis processes for used tires and products produced thereby.

BACKGROUND OF THE INVENTION

The U.S. Environmental Protection Agency (EPA) estimates that approximately 250 million scrap tires are generated in the United States each year. In the United States alone, the Rubber Manufacturers Association (RMA) has estimated that between two and three billion scrap tires currently reside in landfills or are otherwise stockpiled. Waste tires take up a significant amount of space in landfills, and burying of the tires can lead to landfill contamination. Stockpiling waste tires provides breeding grounds for pests and represents a significant fire hazard. Burning of tires causes a significant amount of air pollution, and run-off from tire fires can contaminate ground water. The handling and disposal of waste tires is a significant environmental problem, and the desirability of recycling waste is evident.

One method of recycling waste tires is pyrolysis. Known tire pyrolysis processes include heating tires to produce useful products such as oils, gases, recyclable metals, and carbonaceous char. As disclosed in U.S. Pat. Nos. 5,783,046, 6,372,948, and 7,037,410 to Flanigan, the entire disclosures of which are hereby incorporated herein by reference, a known pyrolysis process includes heating rubber in the substantial absence of oxygen to a temperature sufficient to pyrolyze the rubber, distilling a vapor comprising hydrocarbon from the rubber, and producing a solid carbonaceous char. Weinecke et al. in U.S. Pat. No. 7,101,463, hereby incorporated herein by reference in its entirety, describes a system and process for the recovery of oil from shredded vehicle tires that utilizes a pair of sequentially positioned packed towers. Also disclosed in U.S. Pat. No. 5,894,012 to Denison, hereby incorporated herein by reference in its entirety, is a waste processing system that produces clear and colorless oil for use in rubber and plastic applications and a carbonaceous char equivalent to a low structure furnace black.

Another known tire pyrolysis process is described in U.S. Pat. Nos. 6,835,861 and 7,341,646 to Nichols et al., the entire disclosures of which are hereby incorporated herein by reference. The method includes heating a hydrocarbon material while maintaining a vacuum, using a clay catalyst. The temperature of the reaction chamber and corresponding fuel input is varied either over time or spatially within the reaction chamber, to take advantage of the exothermic properties of the reaction.

There is a continuing need for a waste recycling process that produces a carbon black product suitable for use in rubber, plastic, and other commercial applications. Desirably, the process also produces fuel-grade oil, recyclable metal, gas, energy, and other marketable products.

SUMMARY OF THE INVENTION

In concordance with the instant disclosure, a pyrolysis process that produces a carbon black product suitable for use in rubber and plastic applications, fuel grade oil, recyclable metal, gas, and other marketable products is surprisingly discovered.

In one embodiment, a pyrolysis process includes the steps of: depositing a quantity of waste, such as waste tires, into a porous container adapted to allow a convective stream of substantially anaerobic gas to flow therethrough; inserting the porous container into a pyrolysis thermal processor; sealing the thermal processor; circulating the convective stream of gas through the pyrolysis thermal processor; heating the waste with the convective stream of gas according to a first time-temperature profile to produce a carbonaceous char; and cooling the carbonaceous char by circulating the convective stream of gas through a cooler. A carbon black product, an oil product, a gaseous hydrocarbon product, and a recyclable metal product are thereby produced and may be collected.

In a further embodiment, a pyrolysis system includes a pyrolysis thermal processor. The pyrolysis thermal processor is adapted to hold at least one porous container having waste under a sealed, substantially anaerobic atmosphere. The pyrolysis thermal processor is in communication with a heater adapted to heat the pyrolysis thermal processor to a temperature sufficient to pyrolyze the waste and produce a carbonaceous char. The pyrolysis thermal processor further is in communication with at least one variable speed fan and an internal baffling. The variable speed fan is adapted to regulate a circulation rate of an anaerobic gas through the pyrolysis thermal processor. The variable speed fan and the internal baffling are adapted to regulate a circulation consistency and rate of anaerobic gas in the anaerobic atmosphere. The pyrolysis system may further include a condenser having a substantially open internal pathway formed by a plurality of internal baffles. The condenser is adapted to collect an oil product from the anaerobic gas circulated through the pyrolysis thermal processor.

In another embodiment, a carbon black product is produced from the carbonaceous char formed in the pyrolysis process. The carbon black product includes: a carbon black in an amount between about 65 percent and about 98 percent; an organic volatile material in an amount between about 1 percent and about 20 percent; and an inorganic ash in an amount up to about 15 percent, wherein all percentages are by weight relative to the total weight of the carbon black product.

In an additional embodiment, a desulphurizing pyrolysis process includes the steps of: pyrolyzing a quantity of waste to form a gaseous hydrocarbon product; hydrogenating the gaseous hydrocarbon product to form a quantity of hydrogen sulfide gas; and oxidizing the hydrogen sulfide gas in the gaseous hydrocarbon product to form an elemental sulfur product. The gaseous hydrocarbon product is thereby desulphurized.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
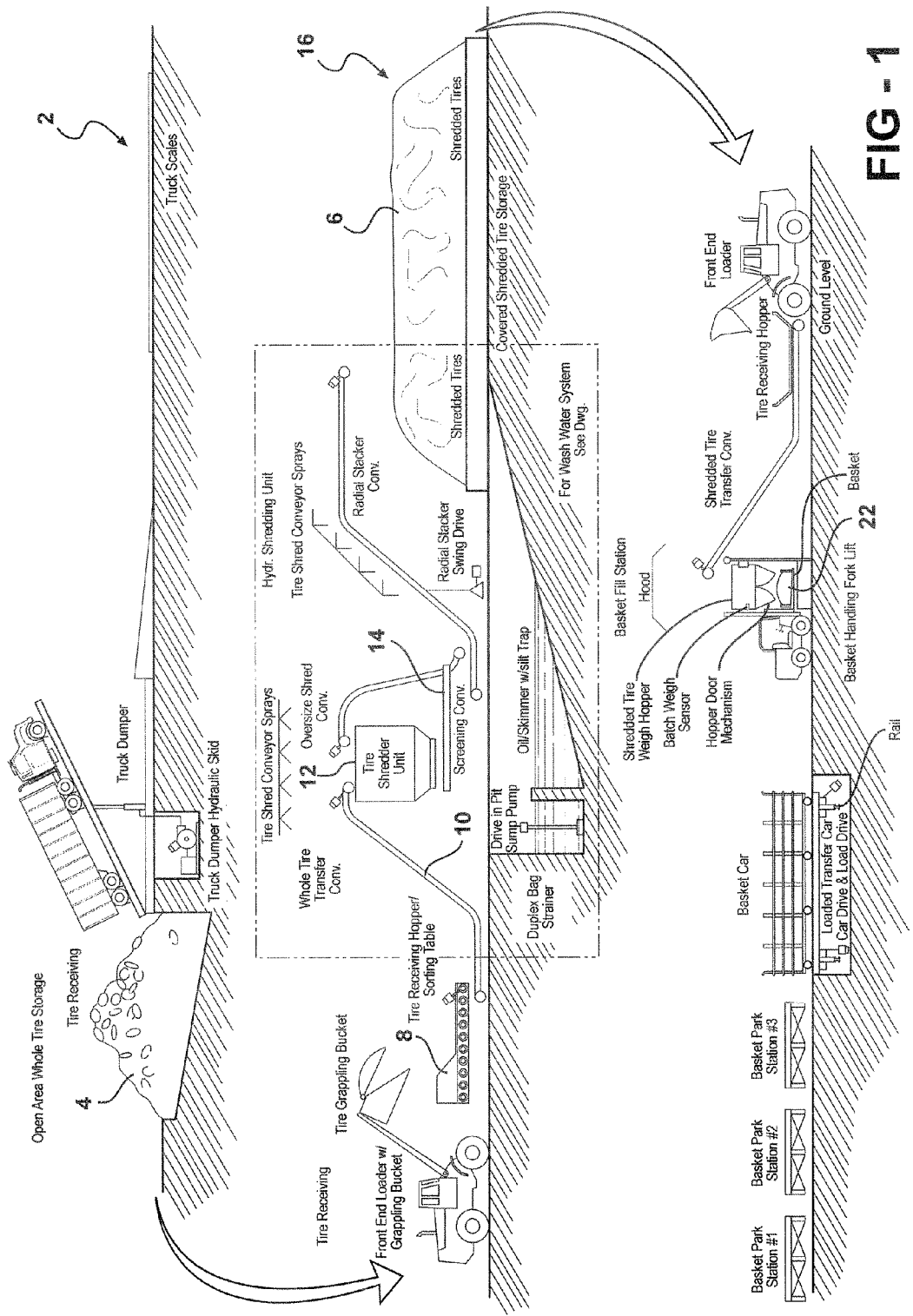
FIG. 1 is a process flow diagram depicting a raw rubber handling system for preparation of waste for pyrolysis.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature and, thus, is not necessary or critical.

The present disclosure includes a method for pyrolyzing waste. As used herein, the term "waste" includes whole tires, tire shreds, waste feedstocks, waste plastic feedstocks, medical waste, and mixtures thereof. The waste feedstocks may include hoses, seals, and miscellaneous rubber articles, for example. As shown in FIG. 1, the method includes a handling system 2 that consumes waste 4, for example waste tires, in loose or baled form, to produce a quantity of shreds 6 for use in a pyrolysis process. A skilled artisan should understand, however, that whole tires may be used in the pyrolysis process as desired.

The waste 4 is transported in bulk from an offsite location, for example, rubber retailers, landfills or rubber stockpiles. The waste 4 is typically stored, if necessary, in a storage pile prior to processing. The waste 4 is then transported to a receiving hopper 8 in communication with a conveyor 10. The conveyor 10 is adapted to feed the waste 4 to a shredder unit 12.

In particular embodiments, the shredder unit 12 is an electrically powered rotary shear which is adapted to reduce the waste 4 to a desired shred size. The waste shreds 6 may be first-pass tire rubber shreds, for example. As nonlimiting examples, the shreds 6 have an average dimension of up to about 10"×10". In further examples, the shreds 6 have an average dimension of about 6"×6". Rubber shreds sized at about 3"×3" and less may also be used. One of ordinary skill in the art should appreciate using whole waste 4 or the waste shreds 6 having a larger average dimension may also be desirable.

Figure 2:
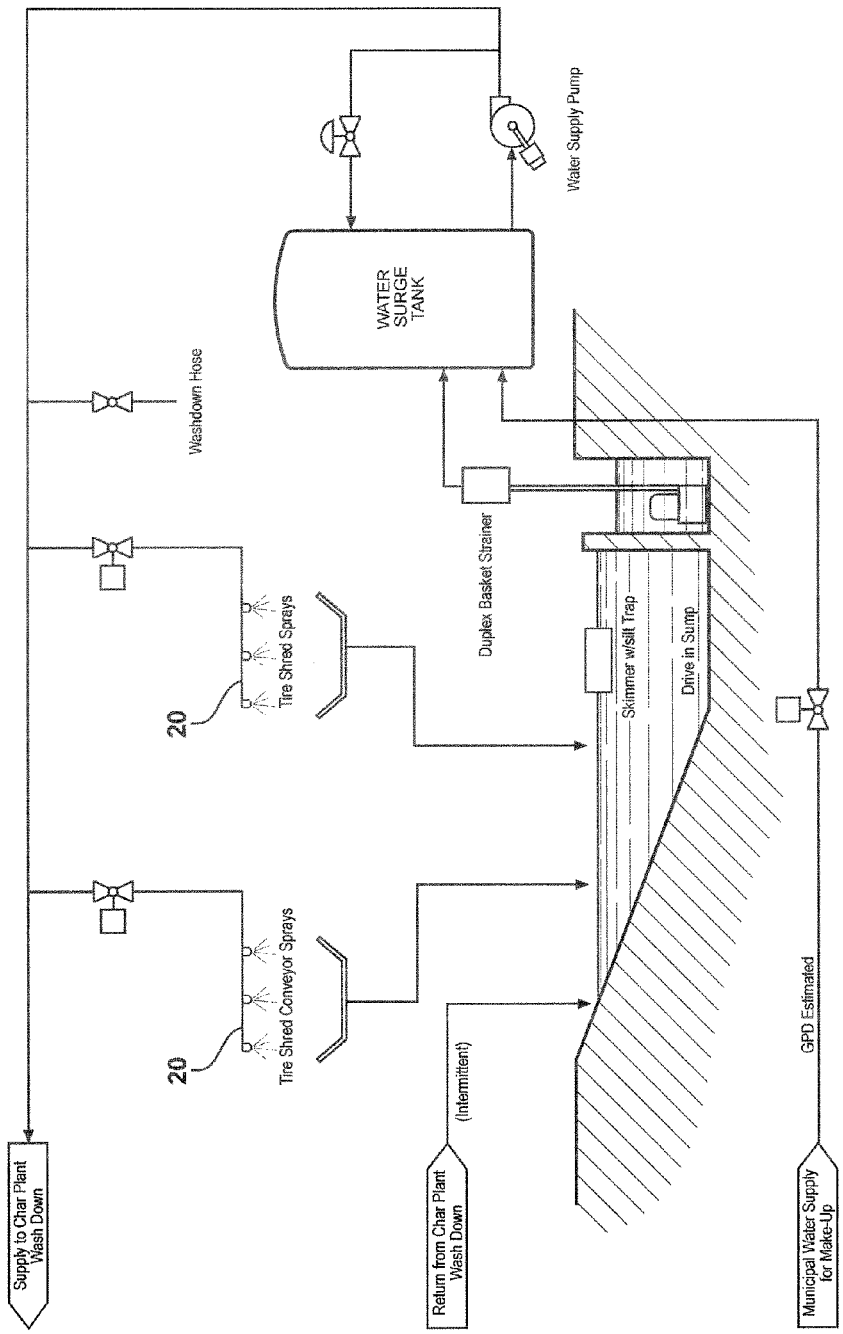
FIG. 2 is a process flow diagram depicting a wash water system for use with a waste pyrolysis system.

Following shredding, the shreds 6 may be delivered to a screening conveyor 14 adapted to return oversized material back to the shredder 12 and convey properly sized shreds 6 to a shredded pile 16. It should be understood that the handling system 2 generates negligible amounts of particulate matter due to the nature of the material being processed and the volume of water that is used during the process for material washing 18, for example, as shown in FIG. 2. As a further example, fugitive dust generated during the process may be controlled by a water truck or fixed water sprays 20 as desired.

Figure 3A:
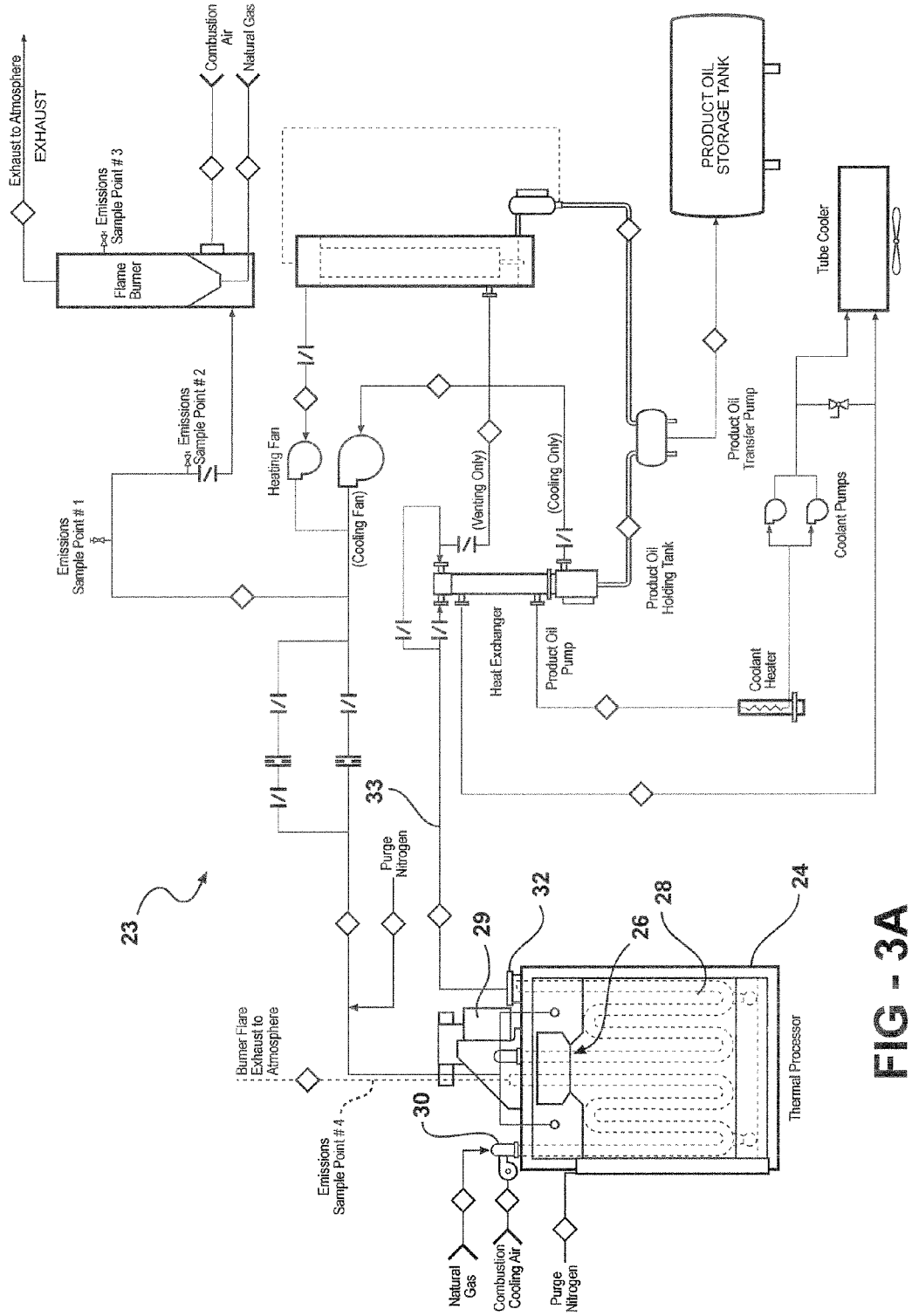
FIG. 3A is a process flow diagram depicting a waste pyrolysis system according to the present disclosure.
Figure 3B:
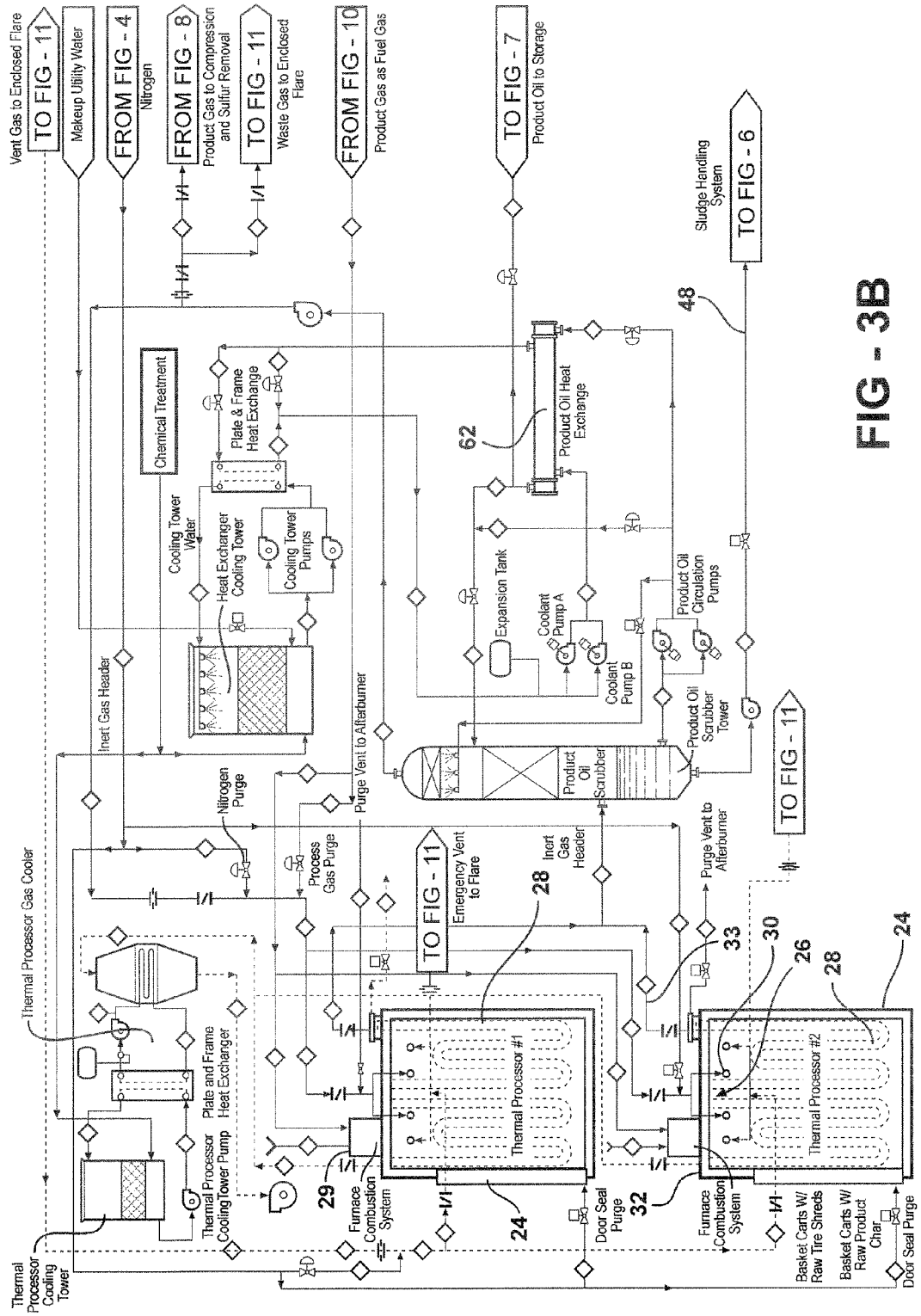
FIG. 3B is a process flow diagram depicting another waste pyrolysis system according to the present disclosure.

With reference to FIGS. 1, 3A, and 3B, a pyrolysis system 23 is described having at least one porous container 22. The waste 4, in shredded or whole form, is loaded into the porous container 22. The porous container 22 is adapted to allow a convective flow of hot gases to flow therethrough. In particular embodiments, the porous container 22 is a wire mesh basket. To begin a pyrolysis process according to the disclosure, the one or more porous containers 22 are inserted into a pyrolysis thermal processor 24. The porous containers 22 may be stacked, for example, on top of one another inside of the pyrolysis thermal processor 24.

The pyrolysis process of the present disclosure is a batch process. In a particular example, a single pyrolysis thermal processor 24 is adapted to hold up to about twenty-four porous containers 22 of waste 4 per batch. Being a batch process, one of ordinary skill in the art should appreciate that more than one pyrolysis thermal processor 24 as shown in FIG. 3B, for example, may be employed on an alternating basis to provide a substantially continuous pyrolysis operation.

The pyrolysis thermal processor 24 has a heater 26 adapted to heat the waste 4 in the thermal processor 24. The waste 4 is heated to a temperature sufficient to pyrolyze the waste 4 and produce a carbonaceous char. In particular, a convective stream 28 of a substantially anaerobic gas is heated with the heater 26. The convective stream 28 is circulated over the waste 4 to heat the waste 4 to the temperature sufficient to pyrolyze the waste 4 and form a carbonaceous char. For example, the pyrolysis thermal processor 24 may utilize radiant tubes as a method of heating the convective stream 28, and thereby the waste 4, to a desired temperature. In certain embodiments, the heater 26 is a gas fired heater. A skilled artisan may select other suitable heaters 26 as desired.

In illustrative examples, the thermal processor 24 is adapted to receive a heat input of up to about 40 MMBtu/hr, in particular embodiments up to about 36 MMBtu/hr, and in a particularly illustrative embodiment up to about 32 MMBtu/hr. As a nonlimiting example, the thermal processor 24 is adapted to operate at an average heat input of about 6.5 MMBtu/hr. It should be understood that other heat inputs suitable for pyrolyzing the waste 4 may be employed as desired.

The pyrolysis thermal processor 24 is further adapted to hold the at least one porous container 22 under a sealed, substantially anaerobic (oxygen-free) atmosphere. An internal circulation of the substantially anaerobic convective stream 28 is provided for a uniform and precise heating of the shreds 6. The internal circulation of the convective stream 28 is facilitated, for example, by at least one fan 29. As a nonlimiting example, the fan 29 is a variable speed fan. In particular embodiments, the variable speed fan 29 is internally disposed within the thermal processor 24. At least one variable speed fan 29 may be adapted to regulate a circulation rate of the substantially anaerobic convective stream 28 within the pyrolysis thermal processor 24, as desired.

In further embodiments, a gas inlet 30 and a gas outlet 32 are formed in the pyrolysis thermal processor 24. The gas inlet 30 and outlet 32 are in communication with a recirculation stream 33 that is withdrawn from the thermal processor 24 by the fan 29. The recirculation stream 33 is withdrawn through the gas outlet 32 and returned back to the thermal processor 24. For example, the recirculation stream 33 is returned to the thermal processor 24 through the gas inlet 30 after removal of condensable hydrocarbon products. It should be appreciated that the recirculation stream 33 also contributes to the substantially anaerobic atmosphere of the thermal processor 24.

The pyrolysis thermal processor 24 may include an internal baffling (not shown) that is further employed to regulate a consistency of the flow of the anaerobic gas streams 28, 33 across a cross-sectional area of the thermal processor 24. The internal baffling militates against a non-uniform heating of the waste 4. It should be appreciated that without the internal baffling, the flow rate of the anaerobic gases outside the porous containers 22 may be greater than the flow rate through the porous containers 22 themselves. A velocity of the substantially anaerobic gas streams 28, 33 circulating through the pyrolysis thermal processor 24 also does not exceed a level where a significant quantity of pyrolyzed particulate matter is swept into the evolved product gases and oil. A need for subsequent scrubbing and clarification processes typically employed in known pyrolysis systems, and designed to remove particulate matter from the product gases and oils, is thereby mitigated.

Figure 4:
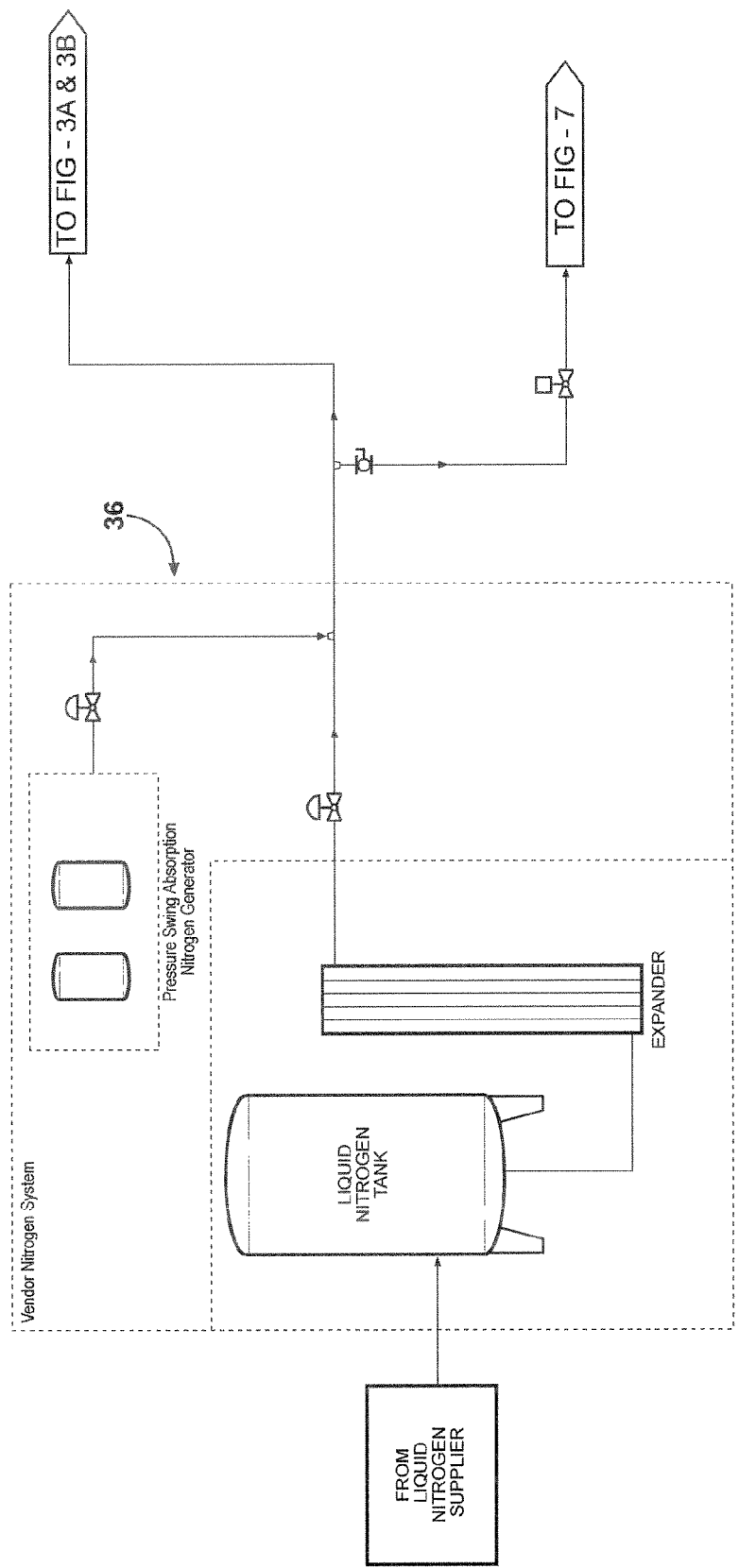
FIG. 4 is a process flow diagram depicting a nitrogen supply system for use with the waste pyrolysis systems of FIGS. 3A and 3B.

Following the insertion of the porous container, the pyrolysis thermal processor 24 is sealed and purged with the substantially anaerobic gas to remove substantially all oxygen. In an illustrative example, the substantially anaerobic gas includes an inert gas such as nitrogen gas, argon gas, and the like. The inert gas may be provided by an inert gas system 36 as shown in FIG. 4, for example In particular embodiments, the pyrolysis thermal processor 24 is initially purged with nitrogen gas and the atmosphere subsequently maintained anaerobic through circulation of hydrocarbon recovery gases evolved during the pyrolysis process. In certain embodiments, the nitrogen gas may be substantially diluted after the initial purge by recovery gases evolved from the pyrolysis process. In other embodiments, supplemental quantities of nitrogen gas are added for purpose of maintaining a desire anaerobic gas composition, or for regulating the temperature of the convective stream 28, for example, during the pyrolysis process. In a particularly illustrative embodiment, the substantially anaerobic convective stream 28 includes both hydrocarbon recovery gases and nitrogen gas throughout the pyrolysis process, following the purge and evolution of the recovery gases from the waste 4.

Pyrolysis of the waste 4 is performed under substantially atmospheric pressure. As a nonlimiting example, the pyrolysis process is performed within about ten percent (10%) of one atmosphere of pressure. In particular embodiments, the pyrolysis process is performed within about five percent (5%) of one atmosphere of pressure. It should be appreciated that the conducting of the pyrolysis process under substantially atmospheric pressure minimizes a complexity of the pyrolysis system 23, particularly in comparison to the various known vacuum, low pressure, and high pressure processes.

Figure 5:
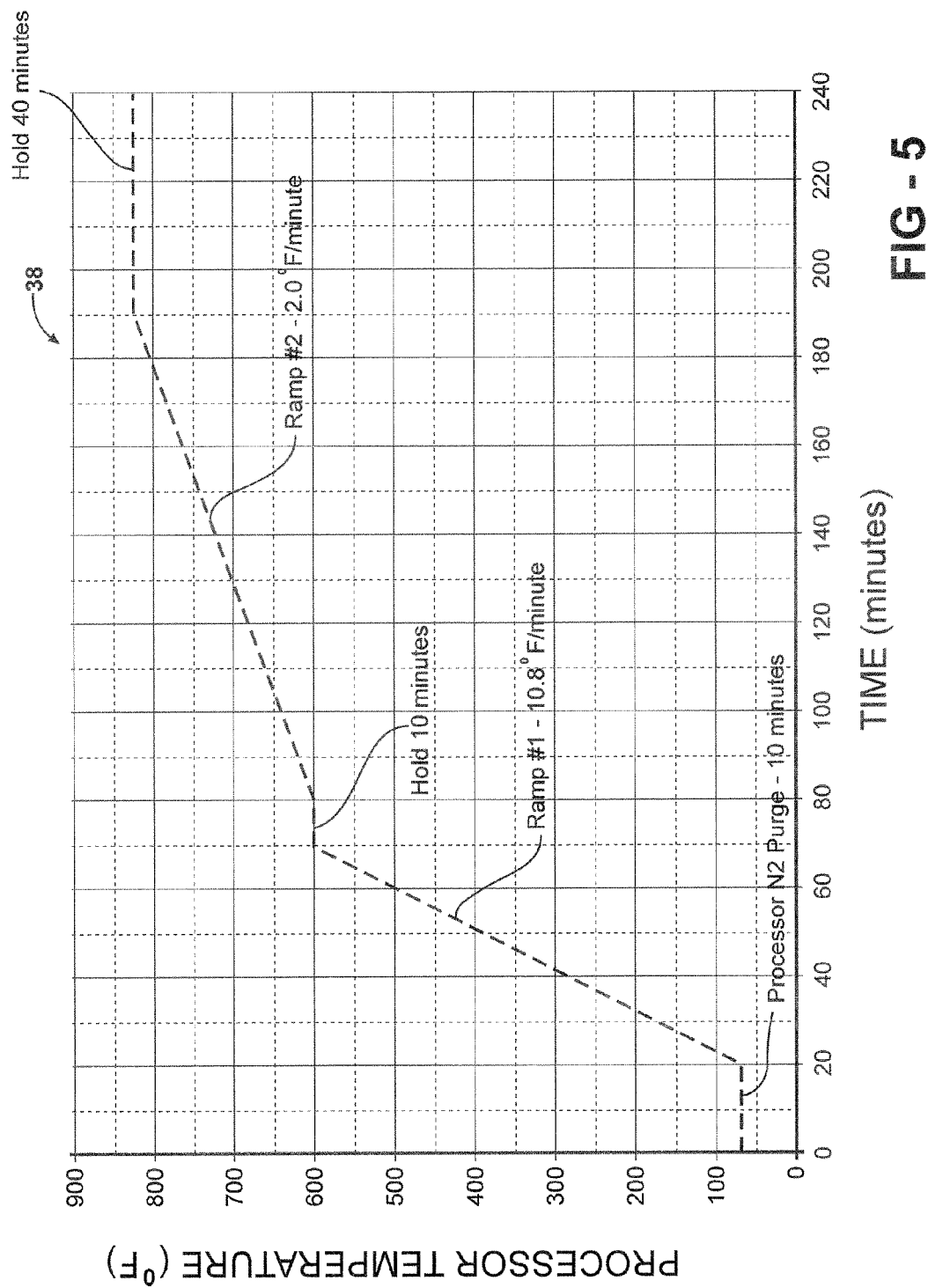
FIG. 5 is a chart depicting an illustrative time-temperature profile for pyrolysis employed in the waste pyrolysis system of the disclosure.

The pyrolysis process is conducted according to a predetermined time-temperature profile 38, for example, as illustrated in FIG. 5. The time-temperature profile 38 may first include a step of ramping a temperature of the thermal processor 24 from an initial temperature to a first temperature. The initial temperature may be the ambient temperature, for example, or a temperature to which the thermal processor was cooled following a previous pyrolysis cycle. The thermal processor 24 is held at the first temperature to evolve quantities of product oils and product gases from the waste 4. The temperature of the thermal processor 24 is then ramped to a second temperature. The thermal processor 24 is held at the second temperature to further pyrolyze the waste 4. The second temperature is typically selected to pyrolyze the waste 4 without significant graphitic formation. The thermal processor 24 is then cooled to a third temperature for removal of the carbonaceous char from the thermal processor 24.

As a nonlimiting example, the waste 4 is first heated to a temperature from about 550° F. to about 650° F. over a period of about 40 to 60 minutes. In one embodiment shown in FIG. 5, the waste 4 is heated to a temperature of about 600° F. (about 315° C.). The thermal processor 24 is held at this temperature for a first soak period of about 5 to about 15 minutes. During the first heating step, product oils and product gases are evolved at a substantial rate.

Following the first heating step, the waste 4 is subjected to a second heating step. In the second heating step, the shreds 6 are heated to a temperature from about 770° F. to about 870° F. over a period of about 90 to 120 minutes. In one embodiment shown in FIG. 5, the waste 4 is heated to a temperature of about 820° F. (about 440° C.). A skilled artisan should understand that temperatures substantially higher than this may result in a graphitization of the carbonaceous char produced during the pyrolysis process.

During the second heating step, evolution of oils and gases continues, but at a diminishing rate. In particular, during the second heating step, residual polymer and high molecular weight hydrocarbons are pyrolyzed to a gaseous state, leaving a uniform carbonaceous char, including carbon black, metal wire and other non-volatile materials (e.g., residual fibers). The second heating step is followed by a second soak period of about 30 to about 60 minutes. The second soak period ensures product and temperature uniformity throughout the volume of the thermal processor 24.

In a particular embodiment, the combined first and second heating steps, including purge and soak times, are performed for a total of about four hours. The pyrolysis process is completed by a cooling step. The cooling step includes lowering the temperature of the pyrolysis thermal processor 24 by circulating at least one of the convective stream 28 and the recirculation stream 33 of anaerobic gases at a temperature of between about 120° F. and about 160° F. In one embodiment, the pyrolysis thermal processor 24 is cooled to an internal temperature of about 140° F. As a nonlimiting example, the streams 28, 33 of anaerobic gases circulated through the thermal processor 24 may be cooled with a wet air cooler. The wet air cooler may be an indirect water-cooled, finned-tube gas cooler as known in the art. The total cycle from initial heating to complete cooling may take up to approximately eight hours. When the thermal processor 24 and load are cooled to a desired temperature, the thermal processor 24 is purged and opened. The porous containers 22 with the solid products are subsequently removed.

The pyrolysis process as described herein provides at least one of a product oil 40, a product gas 42 including gaseous hydrocarbons, a carbon black product 44, recyclable metals 46 such as steel, and minor products such as an immiscible sludge 48 and elemental sulfur 50. It should be appreciated that the carbon black product 44 and the recyclable metals 46 may result from a further processing of the carbonaceous char produced during the pyrolysis process.

Figure 6:
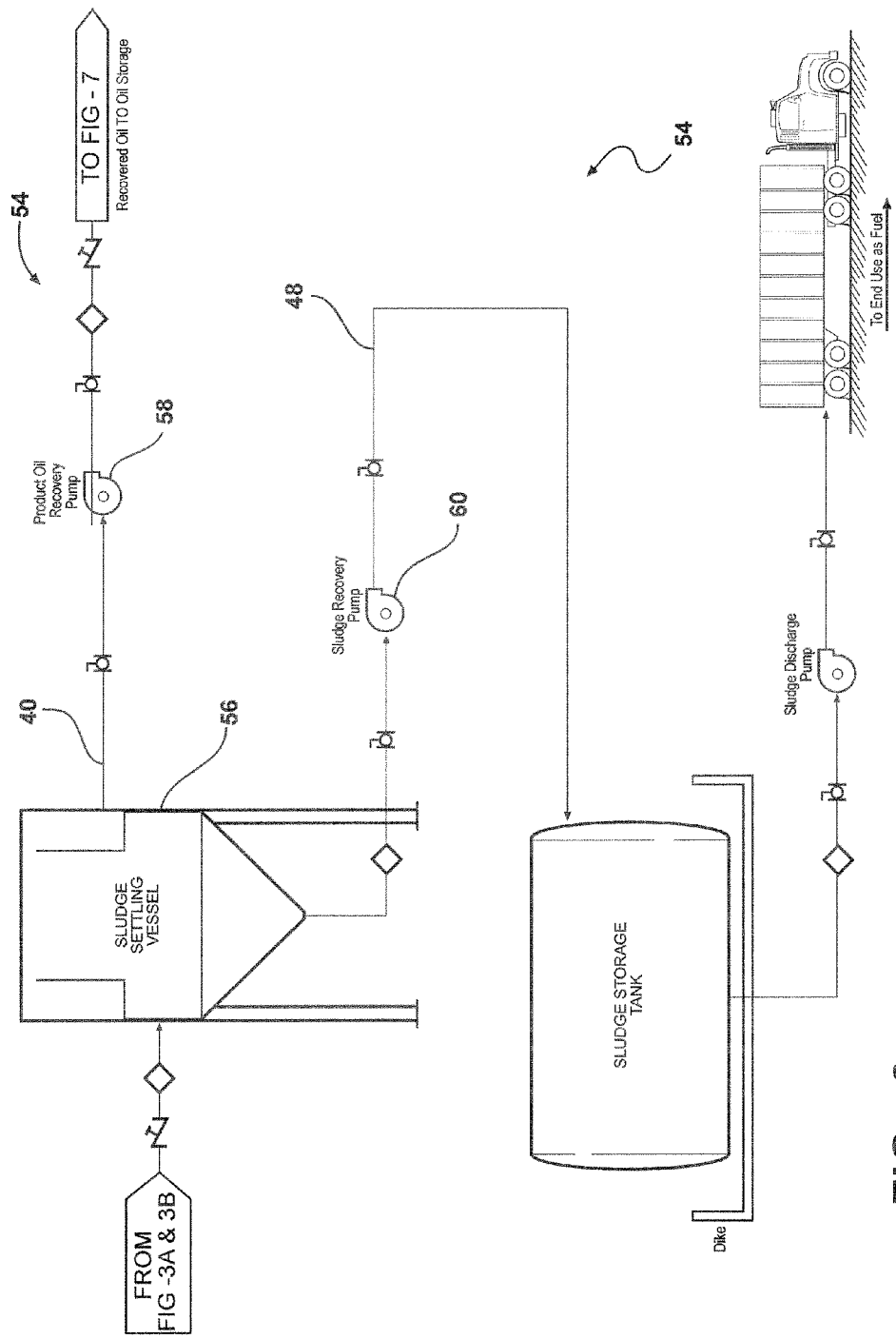
FIG. 6 is a process flow diagram depicting a sludge removal system for use with the waste pyrolysis systems of FIGS. 3A and 3B.

The product oils and gases 40, 42 evolved during the pyrolysis process are conveyed to a product oil scrubber or condenser, for example, where the product oil 40 is separated from the evolved product gases and an immiscible sludge 48. It should be appreciated that the immiscible sludge 48 typically is present as a high molecular weight substituent in the product oil 40. The immiscible sludge 48 may be present at a level of about 0.5 percent to about 10 percent by total weight of the product oil 40, for example. The immiscible sludge 48 may be separated from the product oil 40 through a sludge handling system 54 as shown in FIG. 6. The sludge handling system 54 may include a sludge settling vessel 56 in communication with a product oil 40 recovery pump 58 and a sludge recovery pump 60. The recovery pumps 58, 60 facilitate the removal of the sludge 48 from the sludge settling vessel 56 where it is stored for end use. In further embodiments, the sludge 48 may be reincorporated into the product oil 40 at minimized levels by mixing and emulsification techniques known in the art.

Figure 7:
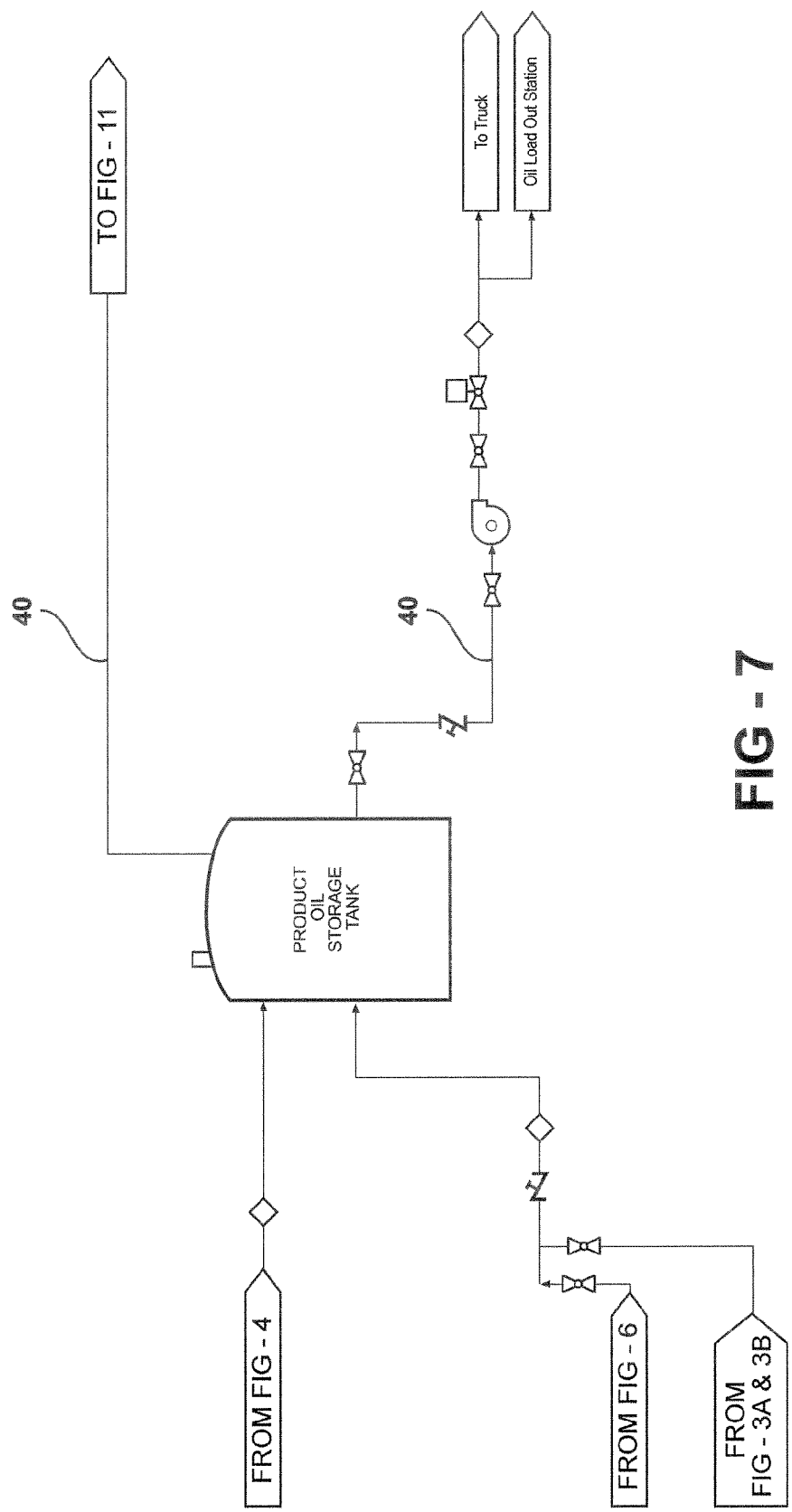
FIG. 7 is a process flow diagram depicting a product oil storage system for use with the waste pyrolysis systems of FIGS. 3A and 3B.

With renewed reference to FIGS. 3A and 3B, the product oils 40 are cooled and sent to storage. The product oils 40 may be cooled with a product oil heat exchanger 62, for example. As a further nonlimiting example, the product oils may be stored in an oil storage system 64 as shown in FIG. 7. The product oils 40 produced according to the present disclosure may be suitable for use as a No. 4 or a No. 6 fuel oil, or as a feedstock for additional refinement.

A suitable condenser 52 for separating the product oils 40 from the circulating convective stream 28 includes a condensation tower having a substantially open pathway. The substantially open pathway may be formed by a plurality of internal plates or fins, for example. The substantially open pathway may be formed by a plurality of side-to-side baffles, each having a downward sloping angle with reference to a plane perpendicular to the condensation tower. A suitable condensation tower is known in the industry as a baffle tray column. The plurality of internal plates or baffles is adapted to condense the product oil 40 and militate against blockage with the immiscible sludge 48. One of ordinary skill in the art should appreciate that a tightly-packed condensation tower, for example, is susceptible to blockages caused by the immiscible sludge 48 and is not suitable for the pyrolysis system 23 of the present disclosure. The condenser 52 provides intimate contact between the incoming convective streams 28, 33 from the bottom of the condenser 52 and the incoming cooling oil from the top of the condenser, thus cooling the pyrolysis gases and heating the cooling oil. The condensable components in the gas streams 28, 33 are thus transferred into the liquid stream and recovered at the bottom of the condenser 52 column.

Figure 8:
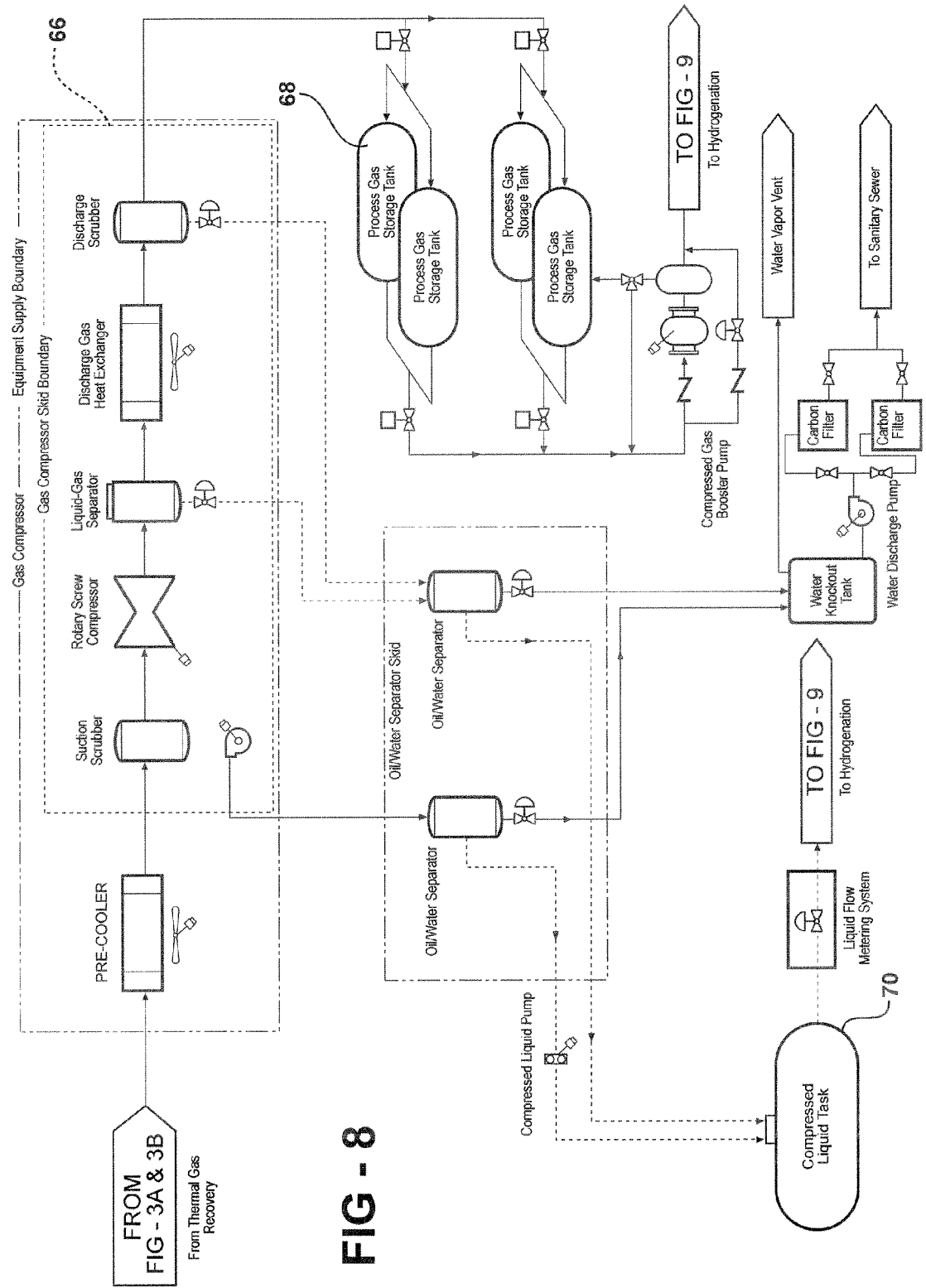
FIG. 8 is a process flow diagram depicting a product gas compression system for use with the waste pyrolysis systems of FIGS. 3A and 3B.

As shown in FIG. 8, the product gases 42 evolved during the pyrolysis process may be separated and compressed according to methods known in the art. As a nonlimiting example, the product gas 42 is compressed in a gas compressor 66 and sent to one or more surge storage tanks 68 where non-uniform pulses of gas flow and gas concentration from the batch pyrolysis process are leveled. One bank of gas storage tanks 68 may be filled while another bank, already filled, is discharged at a substantially constant rate to other processes described herein. A condensed liquid hydrocarbon fraction after compression may be separated from condensed water and stored separately in a liquid tank 70 as one of the product oils 40.

Figure 9:
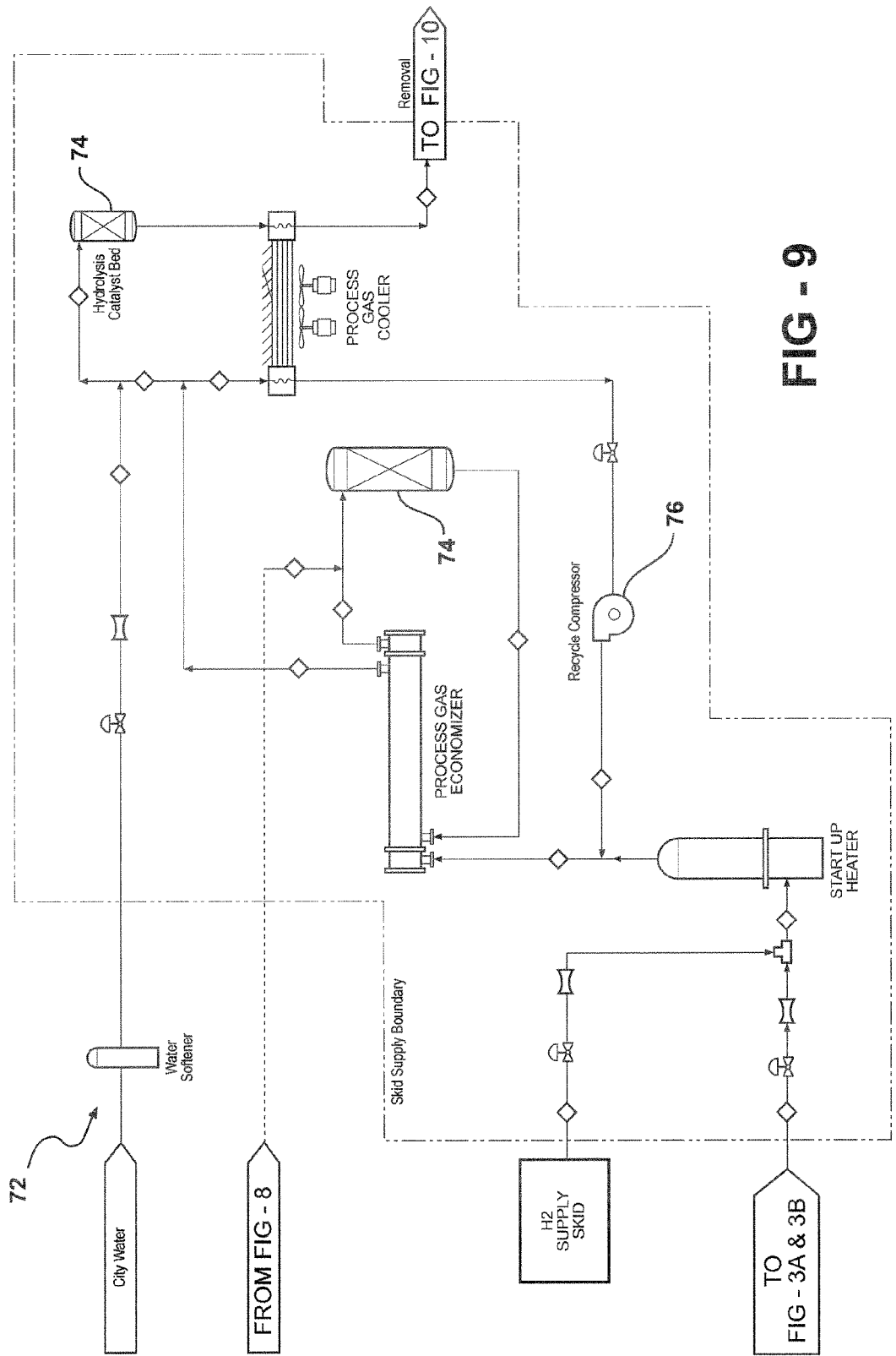
FIG. 9 is a process flow diagram depicting a gas hydrogenation system for use with the waste pyrolysis systems of FIGS. 3A and 3B.

The product gases 42 evolved in the pyrolysis system 23 may be subjected to additional processing steps known in the art, for example, hydrogenation or desulphurization. In a hydrogenation system 72, as depicted in FIG. 9, the product gas 42 and liquid from the compression system may be metered at a constant rate. In this process, sulfur compounds present in the gas and liquid are hydrogenated to hydrogen sulfide ($H_2S$) gas with one or more catalysts 74. Suitable catalysts 74 are known in the art and include, for example, a catalyst 74 selected from the group which consists of nickel, such as Raney nickel catalyst, iron, ruthenium, platinum, cobalt, oxides thereof, and mixtures thereof. The catalysts 74 may be stored in a hydrotreater catalyst bed or like apparatus, for example. The resulting gas is cooled and sent on to desulphurization. A portion of the cooled gas may be recycled through a recycle compressor 76 to provide a heat sink and temperature control to the catalyst 74.

Figure 10:
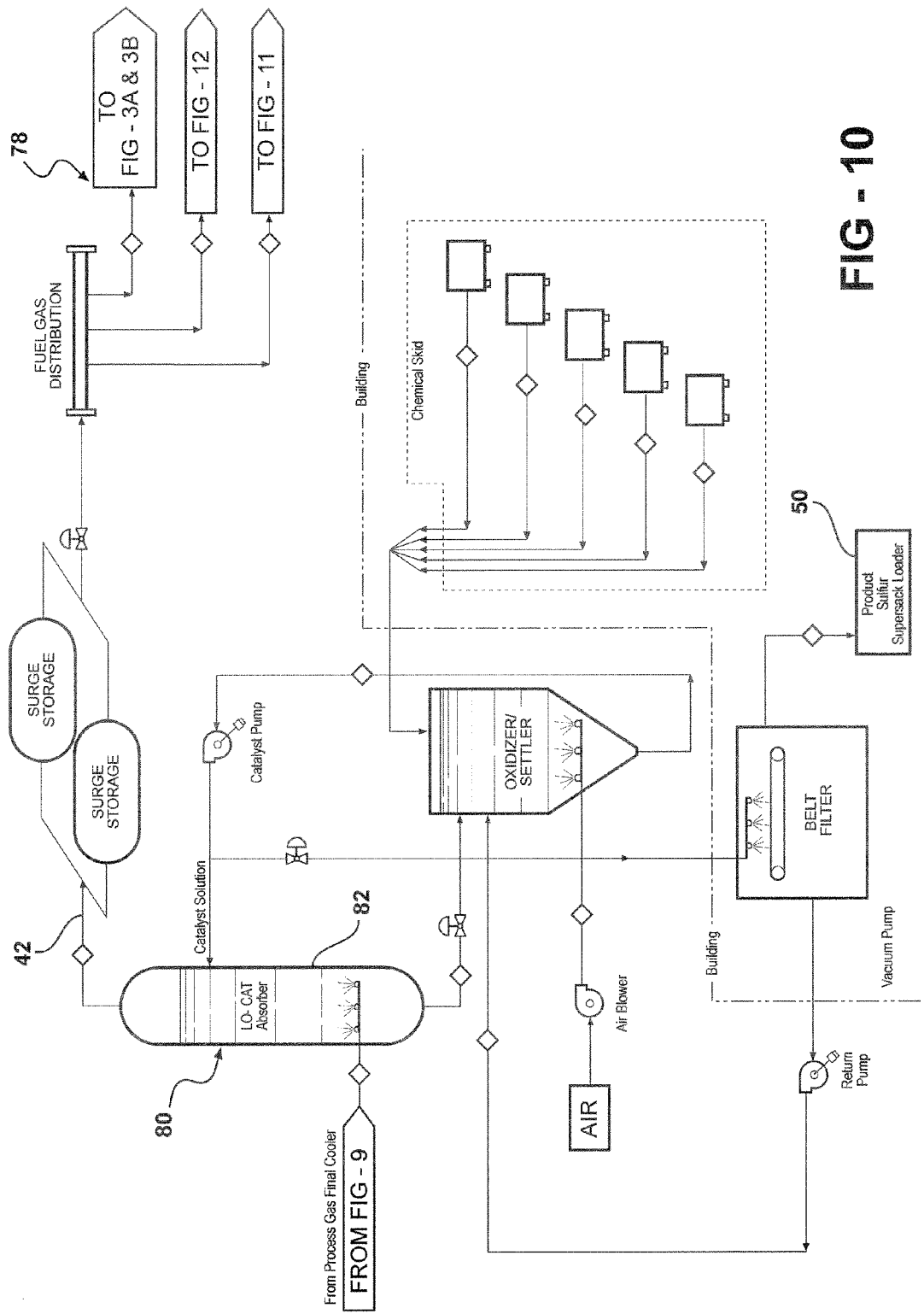
FIG. 10 is a process flow diagram depicting a gas desulphurization system for use with the waste pyrolysis systems of FIGS. 3A and 3B.

In a desulphurization system 78 shown in FIG. 10, the hydrogen sulfide gas is removed with a hydrogen sulfide oxidation system 80 as is known in the art. One suitable hydrogen sulfide oxidation system 80 is known as a LO-CAT system. The LO-CAT system, in particular, is wet scrubbing, liquid redox system. In a nonlimiting example, the hydrogen sulfide gas is sparged through an absorber 82, for example, where the hydrogen sulfide is oxidized by an aqueous iron catalyst to the elemental sulfur product 50. The cleaned product gas 42 exiting the top of the absorber 82 is substantially free of sulfur 50. The cleaned gas product 42 may have a heating value suitable for use in the thermal processors 24. The elemental sulfur product 50 may be suitable for agricultural or industrial uses known in the art. It should be appreciated that other desulphurization processes known in the art may be suitable for use with the pyrolysis process of the disclosure.

Figure 11:
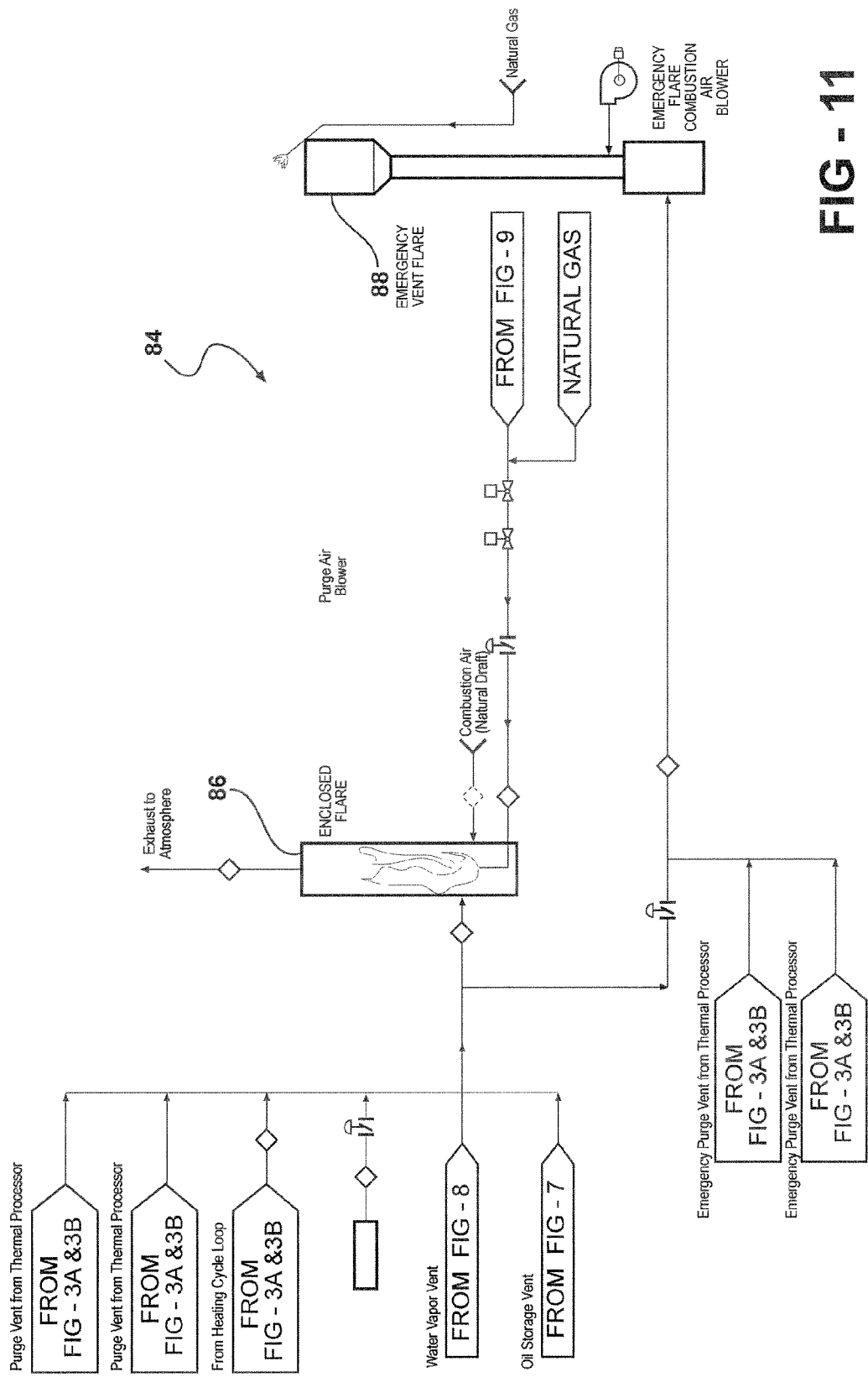
FIG. 11 is a process flow diagram depicting a flare system for use with the waste pyrolysis systems of FIGS. 3A and 3B.

The product gases 42 evolved during the pyrolysis process may include $C_1$ to $C_{10}$ hydrocarbons, for example, methane, ethane, propane, and the like. The product gases 42 may be stored for later use or sale, internally used to feed the heater 26 of the pyrolysis thermal processor 24, and sent to a flare system 84 as shown in FIG. 11. The flare system 84 may include an enclosed flare 86 adapted to provide a discharge of up to about 10 MMBtu/hr and an emergency vent flare 88 adapted to provide a discharge of up to about 150 MMBtu/hr. It should be understood that other flare vents and systems known in the art may be used as desired.

Figure 12:
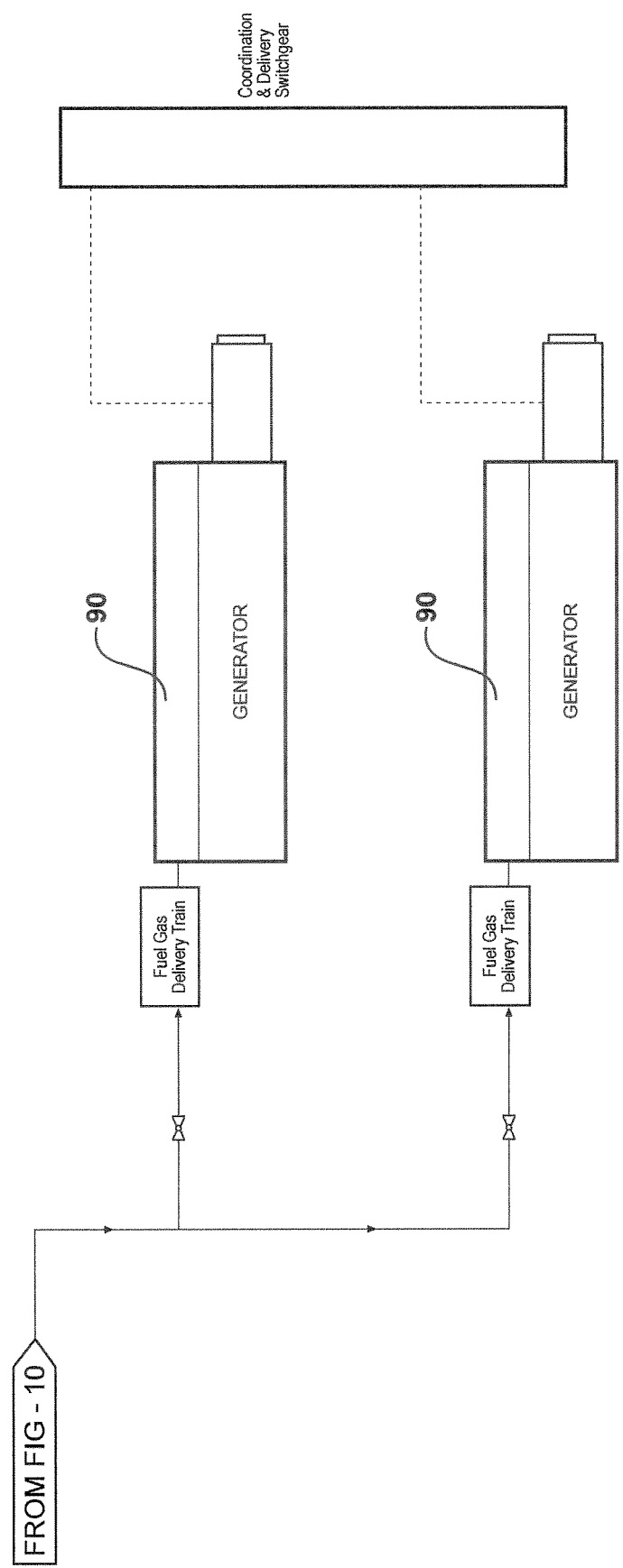
FIG. 12 is a process flow diagram depicting an electric power generation system for use with the waste pyrolysis systems of FIGS. 3A and 3B.

The product oils 40 and gases 42 produced according to the pyrolysis process of the present disclosure may also be employed to power one or more electrical generators 90, for example as shown in FIG. 12. Electricity produced by the electrical generator 90 may be used to power a facility housing the waste pyrolysis system 23 or sold back to the power grid, for example.

The carbonaceous char produced by the pyrolysis process, including the carbon black product 44 and a quantity of recyclable metal 46, are removed from the porous containers 22 following the pyrolysis process. The porous containers 22 having the carbon black product 44 intermixed with recyclable metal 46 (from rubber belt wire, for example) are first removed from the thermal processor 24. The carbon black product 44 and metal 46 are removed from the porous containers 22 and are separated, along with any extraneous materials such as fiberglass, for example, and classified to provide a substantially metal-free, carbon black product 44. The carbon black product 44 is commercially marketable in a fluff, for example in a low-melt bag, or in other forms as described hereafter. The carbon black product 44 may be suitable for use as filler in rubber and plastic compositions.

In particular embodiments, the carbon black product 44 include a carbon black in an amount between about 65 percent and about 98 percent. The carbon black product 44 further includes an organic volatile material in an amount between about 1 percent and about 20 percent. The carbon black product 44 also includes an inorganic ash in an amount up to about 15 percent. All percentages are by weight relative to the total weight of the pyrolyzed rubber product. The inorganic ash includes zinc from zinc oxides present in the original rubber compounds as an activator, and inorganic fillers employed in the rubber compounds, such as silica and clays, for example.

It should be appreciated that the carbon black of the carbon black product 44 is a substantially amorphous carbon. As a nonlimiting example, the carbon black product 44 may include between about 85 percent and about 95 percent carbon black and about 5 percent to about 15 percent residual volatiles in the form of residual polymer and hydrocarbons remaining at the end of the pyrolysis process. The carbon black product 44 also includes an inorganic ash in an amount up to about 9 percent to about 12 percent. It is surprisingly found that the residual volatiles advantageously minimize dusting of the product. The residual volatiles also facilitate dispersion and miscibility of the carbon black product 44 in elastomer and oil applications.

Figure 13:
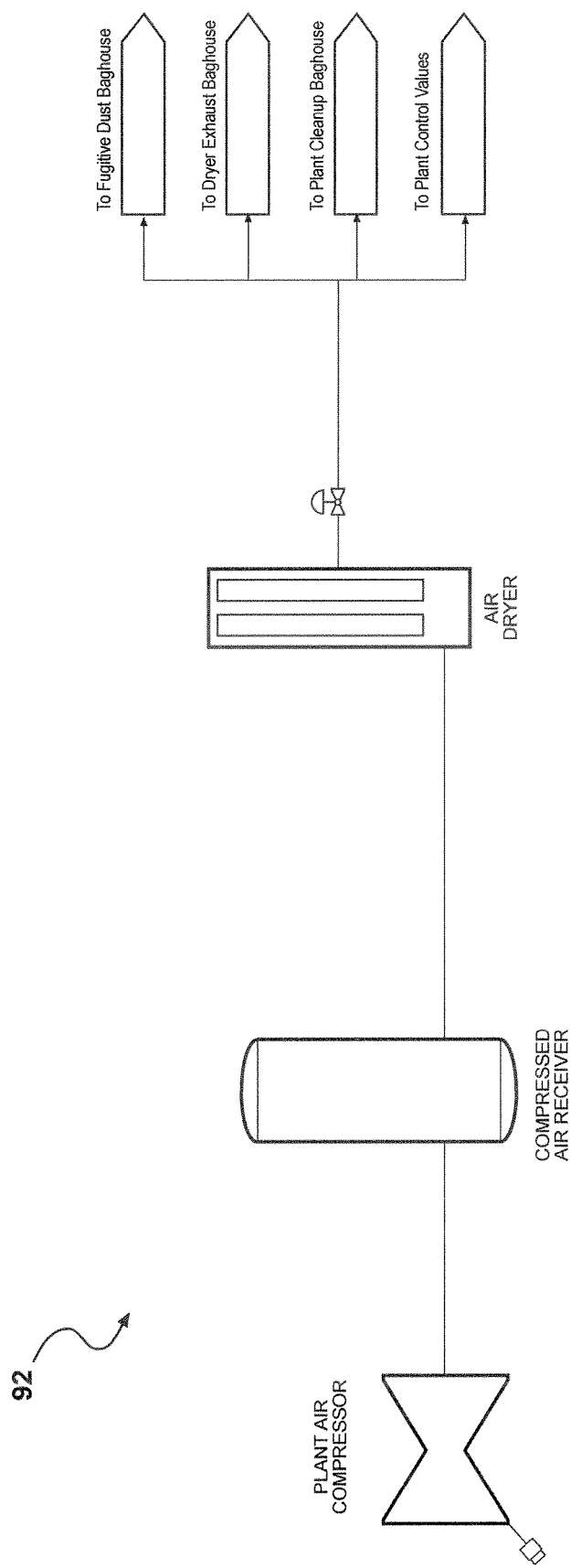
FIG. 13 is a process flow diagram depicting an air compression system for use with the waste pyrolysis systems of FIGS. 3A and 3B.

The substantially metal-free, processed carbon black product 44 may be classified by classifiers known in the art to a particle size of less than 325 mesh, for example. In one embodiment, the waste pyrolysis process provides the carbon black product 44 that when pulverized, up to 99.99% of the carbon black product passes through a 325 mesh screen. The average particle size of the carbon black product 44 may be about five microns, although it should be appreciated that a range of particle sizes may be produced as desired. The carbon black product 44 is pneumatically transferable by air conveyance, for example, in conjunction with an air compression system 118 shown in FIG. 13. A skilled artisan should understand that other means for transferring the carbon black product 44 through the process may be used as desired.

The processed carbon black product 44 may undergo further processing such as bagging, pelletizing, and the like to place the carbon black product 44 in better form for delivery and a desired end use. As a nonlimiting example, the carbon black product 44 may be disposed in low-melt plastic bags for convenience in adding the carbon black product 44 to a rubber or plastic mixer, as desired.

EXAMPLES

As may be observed in Table 1, the carbon black product 44 manufactured according to the present disclosure was analyzed and further tested in an ASTM standard rubber formulation. ASTM testing methods known in the art were employed in evaluating the carbon black product 44.

TABLE I

| Property | ASTM Method | Average | High | Low |
|---|---|---|---|---|
| Specific Gravity | D297 | 1.84 | 1.81 | 1.86 |
| Moisture pelletized (%) | D297 | 0.5 | 2 | 0.1 |
| Tensile (psi) | D3191 | 3000 | 3500 | 2800 |
| Ash (%) | D297 | 10 | 14 | 5 |
| Sieve Residue | | | | |
| 325 mesh (ppm) | D1514 | 200 | 1000 | — |
| 35 mesh (ppm) | D1514 | 0 | 10 | — |

The carbon black product 44 was in the form of a solid, friable black material having a specific gravity of about 1.81 to about 1.86, with an average specific gravity of about 1.81. The carbon black product 44 further had an average moisture content of about 0.5 percent, with a range of moisture content between about 0.1 percent and about 2 percent. The average ash content of the carbon black product was also between about 5 percent and about 14 percent, with an average ash content of about 10 percent by weight of the carbon black product. The specific gravity, moisture, and ash contents were tested according to ASTM D297. ASTM D297 describes standard test methods for rubber products, including chemical analysis of rubber products The carbon black product 44 was mixed into a rubber formulation according to ASTM D3191, titled Standard Test Methods for Carbon Black in SBR (Styrene-Butadiene Rubber)-Recipe and Evaluation Procedures. Tensile testing of the standard SBR formulation with the carbon black product 44 yielded an average tensile strength of about 3000 psi, and a range of tensile strength values between about 2800 psi and about 3500 psi.

The carbon black product 44 was further evaluated according to ASTM D1514 for sieve residue. With a 325 mesh screen, the carbon black product had an average sieve residue of about 200 ppm and a maximum sieve residue of about 1000 ppm. The residue on the 325 mesh screen was observed to be non-crushable carbon black product 44. With a 35 mesh screen, a maximum sieve residue of about 10 ppm was observed.

While certain representative embodiments and details have been shown for purposes of illustrating the invention, it will be apparent to those skilled in the art that various changes may be made without departing from the scope of the disclosure, which is further described in the following appended claims.

What is claimed is:

1. A pyrolysis process, comprising the steps of;
depositing a quantity of waste into a porous container, the porous container adapted to allow at least one convective stream of substantially anaerobic gas to flow therethrough;
inserting the porous container into a pyrolysis thermal processor;
sealing the thermal processor;
circulating the at least one convective stream of gas in the pyrolysis thermal processor;
heating the waste with the convective stream of gas according to a predetermined time-temperature profile to pyrolyze the waste and form a carbonaceous char, wherein the time-temperature profile includes ramping, a temperature of the thermal processor from an initial temperature to a first temperature over a period of about 40 to 60 minutes, wherein the initial temperature is one of ambient temperature and a temperature to which the thermal processor was cooled following a previous pyrolysis cycle, wherein the first temperature is from about 550° F. to about 650° F., holding the temperature of the thermal processor at the first temperature for a first soak period of about 5 to about 15 minutes to evolve quantities of product oils and product gases from the waste, ramping the temperature of the thermal processor to a second temperature over a period of about 90 to 120 minutes, wherein the second temperature is from about 770° F. to about 870° F., holding the temperature of the thermal processor at the second temperature for a second soak period of about 30 to about 60 minutes to pyrolyze the waste and form the carbonaceous char, the second temperature adapted to minimize a graphitization of the carbonaceous char, and cooling the thermal processor to a third temperature by circulating the at least one convective stream through the thermal processor and the cooler, wherein the third temperature is between about 120° F. and about 160° F., wherein the pyrolysis process is performed under substantially atmospheric pressure;

cooling the carbonaceous char by circulating the at least one convective stream of gas through a cooler; and collecting at least one of a carbon black product, an oil product, a gaseous hydrocarbon product, and a recyclable metal product.

2. The pyrolysis process according to claim 1, further comprising the steps of:

providing a quantity of whole tires; and shredding the whole tires to form the quantity of waste to be deposited in the porous container.

3. The pyrolysis process according to claim 1, further comprising the steps of:

purging the thermal processor with a substantially anaerobic purge gas following the insertion of the porous container therein; and recirculating a hydrocarbon recovery gas produced during the heating of the waste through the thermal process, wherein the purge gas and the recovery gas form at least a portion of the convective stream of gas.

4. The pyrolysis process according to claim 1, wherein the step of heating the waste includes the step of heating the at least one convective stream with a gas fired heater to indirectly heat the waste to a temperature sufficient to pyrolyze the waste.

5. The pyrolysis process according to claim 1, further comprising the step of separating a quantity of immiscible sludge from the oil product evolved during the heating of the waste.

6. The pyrolysis process according to claim 1, further comprising the step of separating an extraneous material from the carbonaceous char generated by the pyrolysis of the waste to produce the carbon black product, the carbon black product including a carbon black in an amount between about 65 percent and about 98 percent, an organic volatile material in an amount between about 1 percent and about 20 percent, and an inorganic ash in an amount up to about 15 percent, wherein all percentages are by weight relative to the total weight of the carbon black product.

7. The pyrolysis process according to claim 1, further comprising the steps of:

hydrogenating the gaseous hydrocarbon product, wherein a quantity of hydrogen sulfide gas is formed; and oxidizing the hydrogen sulfide gas in the gaseous hydrocarbon product, to form an elemental sulfur product, wherein the gaseous hydrocarbon product is desulphurized.

* * * * *